Figure 1:
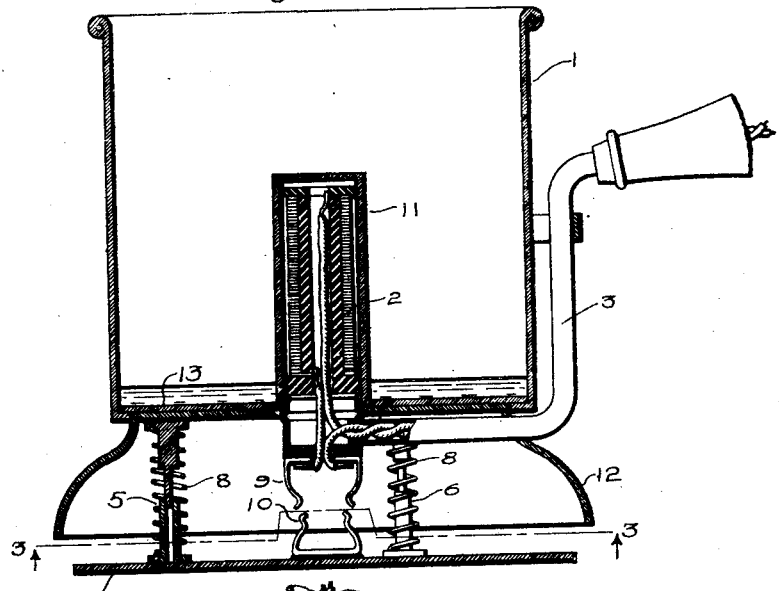

No. 799,377. PATENTED SEPT. 12, 1905.
J. HÄRDEN.
CUT-OUT FOR ELECTRIC HEATERS.
APPLICATION FILED DEC. 1, 1904.

Witnesses:
Harold F. Locke
Helen Oxford

Inventor:
Johannes Härden.
by Albert G. Davis
Att'y.

UNITED STATES PATENT OFFICE.

JOHANNES HÄRDÉN, OF SCHENECTADY, NEW YORK, ASSIGNOR TO GENERAL ELECTRIC COMPANY, A CORPORATION OF NEW YORK.

CUT-OUT FOR ELECTRIC HEATERS.

No. 799,377. Specification of Letters Patent. Patented Sept. 12, 1905.

Application filed December 1, 1904. Serial No. 235,037.

*To all whom it may concern:*

Be it known that I, JOHANNES HÄRDÉN, a subject of the King of Sweden and Norway, residing at Schenectady, county of Schenectady, State of New York, have invented certain new and useful Improvements in Cut-Outs for Electric Heaters, of which the following is a specification.

This invention relates to the improvement of electric heaters.

It has more particularly for its object the improvement of means for controlling the heater and the provision of safety mechanism therefor.

While the use of my invention is not restricted as to the receptacle nor to the form or particular character of heater to be used therewith, I find that it is particularly well adapted for use in connection with a liquid-containing vessel heated by means of an electric current. It is well known that vessels of this character are oftentimes ruined by carelessly allowing the liquid to get so low that the vessel and heating apparatus are destroyed by excessive heat. This is particularly the case when the type of heating unit is one which extends upward from the bottom, a type which is well adapted for rapid heating. My invention overcomes this difficulty by providing means for cutting off the current when the liquid falls below a predetermined point in the vessel.

In the drawings is illustrated one method of carrying out my invention, while the scope thereof is defined by the claims appended to and forming a part of this specification.

Figure 2:
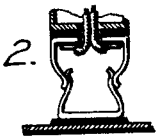
Figure 3:
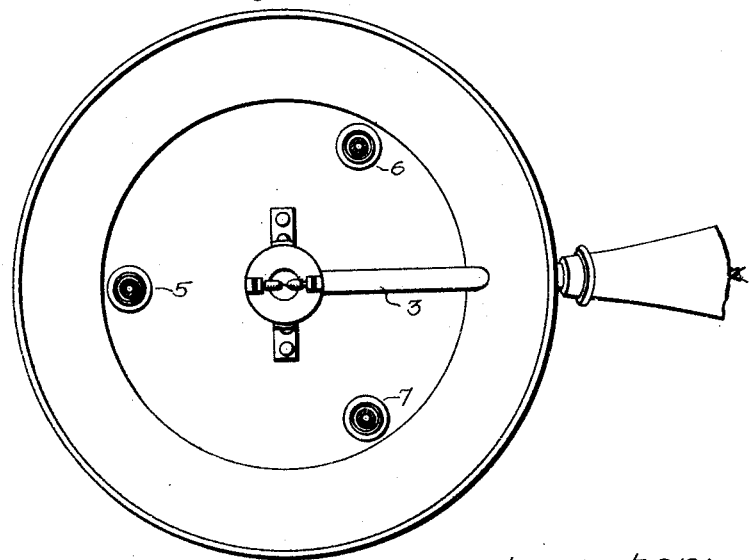

In the drawings, Figure 1 is a sectional elevation of a heating device equipped with my invention. Fig. 2 is a detail of the circuit-interrupter, and Fig. 3 is a section taken on line 3 3 of Fig. 1 looking in the direction of the arrows.

Referring to the drawings, 1 indicates a fluid-containing receptacle, preferably of metal, and which is heated by means of the edge-wound coil 2, constituting a heating unit, the terminal wires of which pass through the handle of the vessel 3, which thereby serves as a conduit.

4 is the base of the receptacle and supports it by means of the telescoping legs 5, 6, and 7, respectively, mounted upon the under side of the receptacle and upon the base. The telescoping portions of these legs are kept apart by means of springs 8, secured thereto, thus forming a resilient connection between base 4 and receptacle 1.

9 indicates the upper, and 10 the lower, portion of a double-pole cut-out or interrupter, both insulated from their supports, the upper portion being connected into the circuit of the heater, while the lower forms a bridging contact and is mounted upon the base 4, as shown. I have shown the cut-out as having spring-jaws so shaped that when forced together they will be locked in that position. This is desirable in order that the cut-out may not be too sensitive to the increase and decrease of weight within the vessel. However, I do not limit myself to this particular form of cut-out, as other forms thereof may be substituted without departing from the spirit of my invention.

I have shown a heating unit as covered by a metallic casing 11, which is flanged to form the bottom of the vessel 13, and at 12 I have shown a protecting-casing which is secured to the bottom of the vessel and which rises and falls therewith.

The operation of my device is very simple. When there is a sufficient quantity of the fluid in the vessel, the contacts 9 10 will be closed, as shown in Fig. 2, and the heater is then in operative condition, while if the fluid falls below a predetermined point—say, for instance, the middle of the casing 11—the springs 8 force the contacts apart and break the circuit. The point at which the liquid in the vessel will open and close the contacts may be varied as desired by varying the strength of the springs 8 and the shape and strength of the springs of the contacts 9 and 10.

What I claim as new, and desire to secure by Letters Patent of the United States, is—

1. The combination of a fluid-receptacle, an electric heater therefor, and means controlled by the weight within the receptacle for cutting out said heater.

2. The combination of a fluid-receptacle, an electric heater therefor, a means for making and breaking the circuit of the same as the height of fluid within the receptacle rises above or falls below a predetermined point.

3. The combination of a fluid-receptacle, an electric heater therein, and an automatic cut-out for said heater, said cut-out being controlled by the weight of fluid within the receptacle.

4. The combination of a liquid-receptacle, electric heating means therefor, a resilient support for said receptacle, and a cut-out for said heating means, said cut-out being operated by said support and controlled by the liquid within the receptacle.

5. The combination of a liquid-receptacle, an electric heater within the same, a supporting-base, resilient connecting means between said vessel and said base, and a cut-out operated by the connecting means and controlled by the weight within the vessel.

In witness whereof I have hereunto set my hand this 30th day of November, 1904.

JOHANNES HÄRDÉN.

Witnesses:
BENJAMIN B. HULL,
HELEN ORFORD.